Oct. 25, 1927.
R. STRESAU
1,647,062
SELF ANCHORING RIVET
Filed June 13, 1923
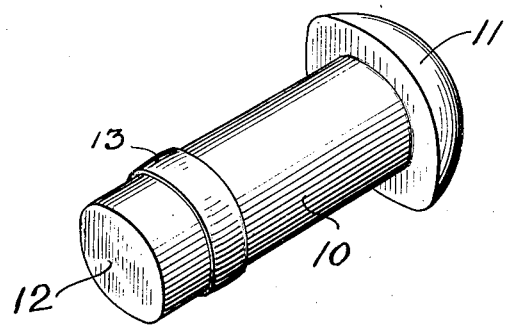
WITNESS
INVENTOR.
Richard Stresau,
BY
ATTORNEYS.

Patented Oct. 25, 1927.

1,647,062

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

SELF-ANCHORING RIVET.

Application filed June 13, 1923. Serial No. 645,042.

The invention involves an improvement upon the self-anchoring rivets shown and described in Letters Patent granted to R. S. Smith, No. 1,457,008, May 29, 1923, to the specification of which Letters Patent reference may be had for an understanding of the general purposes of the invention.

The object of the present invention is to produce a one-piece rivet the shank of which, adapted to enter a rivet hole in parts to be united, is provided with means formed thereon to temporarily anchor or hold the rivet in position pending the final riveting operation, as in the aforesaid Letters Patent, and it is the specific purpose of the invention to produce a rivet with such holding or anchoring means in the form of a circumferential enlargement, without breaking the skin of the shank of the rivet. This result is achieved by producing upon the rivet in the rivet manufacture, preferably, a band or belt extending circumferentially of the shank and which in diameter exceeds slightly that of the shank upon which it is formed, such circumferential enlargement constituting the holding or anchoring provision before referred to.

The specific features of novelty will be pointed out in the appended claims.

The accompanying drawing shows in perspective a rivet embodying my invention, the subject-matter being shown as enlarged considerably above the normal.

In the drawing, the numeral 10 indicates the shank of a rivet, preferably formed as a solid, and with the usual head 11 as one-piece. Near the end point 12 of the rivet, I form about the shank a belt or band 13 as a circumferential enlargement, which in its diameter will slightly exceed that of the registering holes in the parts to be united, as before indicated, so that as the rivet is forced through the holes, a slight compression of the annular enlargement 13 occurs, and thereafter sufficient expansion of the enlargement will take place to securely hold the rivet in position pending the final riveting operation.

It has sometimes occurred that an enlargement upon the shank of the rivet produced by indentation of the surface of the shank or by otherwise breaking such surface, forms the starting point for a split in spreading the point of the rivet. The possibility of this occurrence is obviated by my improvement, which is produced without breaking the surface of the shank of the rivet, so that in the operation of spreading the point to complete the riveting of the parts, the metal flows easily under the pressure exerted and without cracking.

The annular enlargement 13 may be variously formed, and the width of the same and its location, considered with relation to the axis of the rivet, may be varied to meet the needs of the particular work in connection with which it is to be employed. All of such changes are regarded by me as being within the scope of my invention. The rivet embodying my improvement is capable of uses other than that which is described in the Letters Patent aforesaid.

Having thus described my invention, what I claim and desire to secure by Letters Patent of the United States, is:

1. A one-piece headed rivet the shank of which, adapted to enter a rivet hole, is provided with means formed thereon for preliminarily anchoring or holding the rivet pending the final riveting operation, such means comprising an enlargement extending circumferentially of the shank, and adapted to be passed through the rivet hole with a driving fit.

2. A one-piece headed rivet the shank of which, adapted to enter a rivet hole, is provided with means formed thereon for preliminarily anchoring or holding the rivet pending the final riveting operation, such means comprising an annular band or belt extending circumferentially of the shank, and adapted to be passed through the rivet hole with a driving fit.

3. A one-piece headed rivet the shank of which, adapted to enter a rivet hole, is provided with means formed thereon for preliminarily anchoring or holding the rivet pending the final riveting operation, such means comprising an annular band or belt spaced from the head of the rivet and extending circumferentially of the shank of the latter, and adapted to be passed through the rivet hole with a driving fit.

In testimony whereof, I have signed my name at Milwaukee, this 7th day of June, 1923.

R. STRESAU.